United States Patent [19]

Ohya et al.

[11] Patent Number: 4,944,373
[45] Date of Patent: Jul. 31, 1990

[54] DISC BRAKE PAD

[75] Inventors: Kazuyuki Ohya; Hidenori Kimbara, both of Tokyo, Japan

[73] Assignee: Mitsubishi Gas Chemical Company, Inc., Tokyo, Japan

[21] Appl. No.: 359,554

[22] Filed: Jun. 1, 1989

[30] Foreign Application Priority Data

Jun. 3, 1988 [JP] Japan .................. 63-135436

[51] Int. Cl.$^5$ .............................. F16F 69/02
[52] U.S. Cl. ................. 188/251 A; 560/301
[58] Field of Search ............. 188/73.1, 251 A, 251 R; 192/107 M; 560/301

[56] References Cited

U.S. PATENT DOCUMENTS

| 4,373,038 | 2/1983 | Moraw et al. | 188/251 A X |
|---|---|---|---|
| 4,418,115 | 11/1983 | LeLannou | 188/251 A X |
| 4,420,067 | 12/1983 | Yamamoto et al. | 188/251 A X |
| 4,477,629 | 10/1984 | Hefner, Jr. | 560/301 X |
| 4,612,359 | 9/1986 | Hefner, Jr. | 560/301 X |
| 4,839,442 | 6/1989 | Craig, Jr. | 560/301 X |

*Primary Examiner*—Duane A. Reger
*Attorney, Agent, or Firm*—Browdy and Neimark

[57] ABSTRACT

An asbestos-free disc brake pad is provided by employing a cyanate ester-based resin composition as binder. The disc brake pad exhibits consistent braking properties over a wide range of operating temperatures and an improved service life. Also the serious pollution problem due to use of asbestos in the conventional brake pads is removed.

6 Claims, No Drawings

DISC BRAKE PAD

BACKGROUND OF THE INVENTION

This invention relates to a novel disc brake pad exhibiting a less decrease in the friction coefficient as well as a less wearing at high temperatures and capable of maintaining its adhesion to the metal substrate with little lowering the bond strength during the service life. In particular, the invention relates to a high performance brake which comprises a brake pad free from asbestos reinforcement.

Hitherto, friction materials comprising asbestos as a reinforcement material and a phenol resin as a binder have been employed in a wide range of application, since the materials show an excellent cost performance. However, it was found that asbestos is a carcinogenic substance. When asbestos-containing friction materials are used, the asbestos is worn out and may cause an environmental pollution to happen. This has been a serious problem attracting public attention.

Therefore, it has been studied to use, in place of the asbestos material, any suitable admixture of fibrous materials, such as glass fibers, rock fibers, steel fibers, brass fibers, aramide fibers and the like which are more expensive than asbestos. At first, a brake pad comprising steel fibers as reinforcement material was developed. However, this brake pad shows various disadvantages, for example, vapor lock of the brake fluid caused by the high thermal conductivity of the steel reinforcement material, rusting of the steel base material and fastening thereof to the brake disc with rust; and increased fuel consumption because a big amount of weight by the prior pad is loaded to spring due to the high specific gravity of the prior pad. Thus, this type of brake pads have been used only in a limited range of applications.

On the other hand, it has been required that controlling units such as brake and clutch should be of a high performance and, at the same time should be compact, from a view point of the performance of modern engines (e.g., automotive engines) with respect of their increased power output and improved fuel cost and also from a view point of the designing thereof. For example, it is required for disc brake units that they are operable at higher temperatures than those at which the conventional disc brake units have been operated. For example, it is desired that the units are operable at temperatures of higher than 300° C. or even 350° C. It is also required from the safety aspect that the performance of the friction materials in the disc brake units should not degrade at high temperatures and should provide an elongated service life.

However, the conventional asbestos/phenol resin-based materials have not been able to satisfy these requirements.

It has been proposed to employ a reinforcement material comprising any suitable admixture of glass fibers, rock wool, steel fibers, brass fibers, aramide fibers and the like and a binder system comprising a phenol resin and a melamine resin. With this proposition, although the smoking problem experienced with the conventional materials has been improved, the wear-resistant properties have not been improved.

There is disclosed in Japanese Patent Public Disclosure (KOKAI) No. 63-10658 assigned to the assignee of this application a method for producing wear resistant, sliding parts comprising the steps of preparing a curable resin composition comprising a cyanate ester resin and finely milled carbon fibers and shaping said curable resin composition on the surface of a metallic substrate to give an integrated cured product. In this Japanese KOKAI specification, it is said that the product shows a low friction coefficient. On the contrary the friction materials used in the disc brake units should maintain an appropriately controlled level of friction coefficient in the temperature range of up to 300° C. or even more and be well resistant to wearing under the operation conditions. The requisites for the disc brake friction materials are inconsistent with the low friction coefficient property of the product disclosed in the above-mentioned Japanese KOKAI specification. Thus, it is far from the teaching of the Japanese KOKAI specification to expect that a cyanate ester based-resin composition is applicable in the field of manufacturing of disc brakes having an appropriately controlled high level of friction coefficient.

We have intensively studied to solve the above discussed problems of the prior art and found surprisingly that when a disc brake pad is produced using a cyanate ester based curable resin composition as a binder, the pad is capable of well maintaining a satisfactory level of friction coefficient even at such elevated temperatures (exceeding 350° C.) that otherwise the composition itself would not be able to resist in air. It has been also found that the pad shows an acceptably low wearing even at the elevated temperatures. Further, it has been found that the pad formed integrally with a metallic substrate used for the disc brake fabrication has an excellent bond strength to the substrate at highly elevated temperatures. These findings have resulted in the present invention.

SUMMARY OF THE INVENTION

Accordingly, the present invention provides a disc brake pad which comprises an integral mass produced by molding a friction material-forming thermosetting resin composition together with a substrate under heated and pressurized conditions, said thermosetting resin composition comprising:

(A) about 7–40 parts by weight of a cyanate ester-based curable resin composition consisting essentially of (a) a polyfunctional cyanate ester, a prepolymer of said cyanate ester, or a prepolymer of said cyanate ester with an amine; or (a) in combination with at least one of (b) a polyfunctional maleimide, a prepolymer of said maleimide or a prepolymer of said maleimide with an amine, and (c) an epoxy resin.

(B) about 25–70 parts by weight of fibrous reinforcement material having a fiber diameter of not less than 0.1 $\mu$m, and (C) about 15–60 parts by weight of a friction abrasion moderator agent.

The above-defined thermosetting resin composition suitable for preparing friction materials will be referred to as "the present shaping material" hereinafter for convenience.

In an aspect, the invention provides the above-specified disc brake pad wherein the substrate is an iron or steel plate preformed into a predetermined configuration and having a surface roughened by grinding and precoated with a thin layer of said cyanate ester based-curable resin composition, onto which surface the present shaping material is to be applied and integrally shaped.

The invention provides also the specified pad wherein said cyanate ester-based curable resin composition (A) is present in a proportion of 12–25% by weight in the present thermosetting resin composition.

In a further aspect, the invention provides the specified pad wherein said fibrous reinforcement material (B) selected from glass fibers or rock wool fibers.

The invention provides also the specified pad wherein the friction abrasion moderator (C) comprises 5–25 parts by weight of a lubricant component comprising graphite as an essential component and optionally molybdenum disulfide and potassium titanate, 1–7 parts by weight of an organic low-temperature friction agent selected from a rubber, a cured resin powder or cashew dust and 5–15 parts by weight of an aid selected from barium sulfate or calcium carbonate.

In a further aspect, the invention provides also the specified pad wherein the friction abrasion moderator (C) comprises 5–25 parts by weight of a lubricant component comprising graphite as an essential component and optionally molybdenum disulfide and potassium titanate, 1–7 parts by weight of an organic low-temperature friction agent selected from a rubber, a cured resin powder or cashew dust, 5–25 parts by weight of a metallic powder selected from copper, brass or iron and 5–15 parts by weight of an aid selected from barium sulfate or calcium carbonate.

DETAILED DESCRIPTION OF THE INVENTION

The invention will be described in more detail hereinafter.

The cyanate ester-based curable resin composition (A) used in the invention comprises, as an essential component, a polyfunctional cyanate ester or a prepolymer prepared therefrom. Exemplary materials include cyanato resins [see, for example, Japanese Patent Publication (KOKOKU) Nos. 41-1982, 45-11712 and 44-1222 and German Pat. No. 1190184], cyanate ester-maleimide resins, cyanate ester-maleimide-epoxy resins [see, for example, Japanese Patent Publication (KOKOKU) Nos. 54-30440 and 52-31279 and U.S. Pat. No. 4110364], cyanate ester-epoxy resins see Japanese Patent Publication (KOKOKU) No. 46-41112] etc.

A preferred class of the polyfunctional cyanate esters are compounds represented by the general formula:

R(OCN)$_m$ (1)

wherein m is an integer of 2 or greater, usually up to 5 (inclusive), R is an aromatic organic radical and the cyanato groups are linked onto the aromatic ring of said organic radical. Particular examples of these compounds include 1,3- or 1,4-dicyanatobenzene, 1,3,5-tricyanatobenzene, 1,3-, 1,4-, 1,6-, 1,8-, 2,6- or 2,7-dicyanatonaphthalene 1,3,6-tricyanatonaphthalene, 4,4'-dicyanatobiphenyl, bis(4-cyanatophenyl)methane, 2,2-bis(4-cyanatophenyl)propane, 2,2-bis(3,5-dichloro-4-cyanatophenyl)propane, 2,2-bis(3,5-dibromo-4-cyanatophenyl)propane, bis(4-cyanatophenyl)ether, bis(4-cyanatophenyl)thioether, bis(4-cyanatophenyl)sulfone, tris(4-cyanatophenyl)phosphite, tris(4-cyanatophenyl)phosphate, cyanate esters prepared by reacting hydroxy-terminated polycarbonate oligomers with a halogenated cyan (see U.S. Pat. No. 4026913) and cyanate esters prepared by reacting novolak with a halogenated cyan (see U.S. Pat. No. 4022755 and U.S. Pat. No. 3448079). Other cyanate esters which may be used are described, for example, in Japanese Patent Publication (KOKOKU) Nos. 41-1928, 43-18468, 44-4791, 45-11712, 46-41112 and 47-26853; Japanese Patent Public Disclosure (KOKAI) No. 51-63149; and U.S. Pat. Nos. 3553244, 3755402, 3740348, 3595900, 3694410 and 4116946.

The above-listed polyfunctional cyanate esters may be polymerized in the presence or absence of a mineral acid, a Lewis acid, a salt (e.g., sodium carbonate, lithium chloride) or a phosphate ester (e.g., tributyl phosphine) to give prepolymers which may be used. Generally, these prepolymers contains in their molecules a sym-triazine ring formed by trimerization of the cyano groups in the cyanate ester materials.

Furthermore, the above-listed polyfunctional cyanate esters may be used in the form of prepolymers with amines. Preferred examples of this type prepolymers include metaor para-phenylene diamine, meta- or para-xylylene diamine, 1,4- or 1,3-cyclohexane diamine, hexahydroxylylene diamine, 4,4-diamino-biphenyl, bis(4-aminophenyl)methane, bis(4-aminophenyl)ether, bis(4-aminophenyl)sulfone, bis(4-amino-3-methylphenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(4-amino-3-chlorophenyl)propane, bis(4-amino-3-chlorophenyl)methane, 2,2-bis(4-amino-3,5-dibromophenyl)propane, bis(4-aminophenyl)phenyl methane, 3,4-diaminophenyl-4-aminophenyl methane, 1,1-bis(4-aminophenyl)-1phenyl ethane, and the like.

The above-mentioned polyfunctional cyanate esters, the prepolymers thereof and the prepolymers thereof with amines may be used alone or in admixtures thereof. Preferably, they have a number average molecular weight of not greater than 1,700, particularly in the range of about 500–1,500 whether they are used alone or in admixture.

The polyfunctional maleimides which may be incorporated in the cyanate ester-based resin composition are typically cyanate ester-maleimide resins [see, for example, Japanese Patent Publication (KOKOKU) No. 54-30440], cyanate ester-maleimide-epoxy resins [see, for example, Japanese patent Publication (KOKOKU) No. 52-31279] and cyanate ester-epoxy resins [see, for example, Japanese Patent Publication (KOKOKU) No. 46-41112] and are defined to be compounds represented by the general formula:

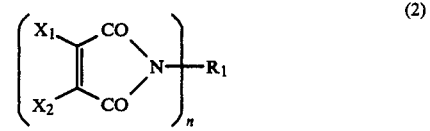

(2)

(wherein R$_1$ is an aromatic or cycloaliphatic organic radical having a valency of greater than 2, usually not greater than 5; X$_1$ and X$_2$ which may be the same or different are each hydrogen, a halogen or an alkyl group; and n is an integer of, usually, from 2 to 5) and prepolymers derived from these compounds.

The maleimides represented by the above formula (2) may be prepared by a known synthesis route in which maleic anhydride or a derivative thereof is reacted with a polyamine having 2–5 amino groups to give a maleamide acid, which is then subjected to dehydration-cyclization. The polyamines used for this purpose are preferably aromatic polyamines on account of desirable properties (e.g., heat resistance) achieved in the final resin. However, if desired that the final rein should be flexible or pliable, then a cycloaliphatic polyamine may be used alone or in place of part of the aromatic polyamine. Desirably, the polyamines are primary amines because of their reactivity, although secondary amines may be used. Preferred examples of the amines are those for use in the above-described preparation of the cyanate ester prepolymers; melamines containing an s-triazine ring; polyamines prepared by reacting aniline and formaldehyde and linking the benzene rings of the product by means of methylene linkage. Usually the maleimide component may be present in a proportion of not greater than 60% of the resin-forming components in the composition.

The epoxy resins which may be used in the present invention are any conventional ones which have been used in molding applications. Particular examples include bisphenol A type epoxy resins, phenol-novolak type epoxy resins, cresol-novolak type epoxy resins halogenated bisphenol A type epoxy resins, halogenated phenol-novolak type epoxy resins and other known polyfunctional epoxy resins of a functionality of 3 or higher, for example, triglycidoxybenzene. These may be used alone or as mixtures thereof. Preferably, the polyamines are trifunctional or higher and usually used in a proportion of not greater than 50% of the resin-forming components in the composition.

The fibrous reinforcement material (B) having a fiber diameter of not less than 0.1 $\mu$m used in the present invention may be inorganic or metallic fibers or heat resistant resinous fibers. Particular examples include glass fibers, rock-wool fibers, steel fibers, carbon fibers, novoloid fibers, potassium titanate fibers, totally aromatic polyamide fibers (aramide fibers, nomex fibers), poly(phenylenesulfide) fibers, poly(ether ether ketone) fibers, and polyetherimide fibers. It is preferred that glass fibers or rock wool fibers are used as a major component in the reinforcement. In particular, rock-wool fibers are preferably used as a major component. The fibrous reinforcement material materials may be treated with any suitable surface treating agent such as a titanate coupling agent, silane coupling agent and the like before use.

Examples of the friction abrasion moderators (C) which may be used in the invention include materials, such as graphite, molybdenum disulfide, lead, calcium difluoride, phthalocyanine, copper phthalocyanine and fluoroplastics (e.g., Teflon), which are mainly effective for improving the lubricity at high temperatures and reducing high-temperature wearing; organic low-temperature friction materials which improve the friction coefficient and wearing properties in the lower temperature range, for example powdery rubber, cured phenol-novolak resin and other cured resin powders of excellent heat resistance and no melt flowability, and cashew dust; abrasion moderators which improve the friction coefficient and anti-fade properties in the higher temperature range, for example, alumina, silica, chopped glass fibers, rock wool short fibers, mullite, ceramics and the like; and aids which are effective for cleaning the disc surface and improve the anti-fade properties, for example, inorganic powders such as barium sulfate and calcium carbonate, powders or chips of metals such as copper brass, bronze, iron, zinc and tin, and metal oxides, such as copper oxide, antimony trioxide, zirconium oxide, ferric oxide and the like.

A preferred friction abrasion moderator for use in the present invention is a system consisting of a lubricant comprising graphite and optionally molybdenum disulfide and potassium titanate, an organic, low-temperature friction material comprising a rubber powder, cured resin powder or cashew dust, and an aid comprising barium sulfate or calcium carbonate. A system comprising the above-described system having a metallic powder of copper, brass or iron as aid incorporated therein is also preferred.

The amount of the cyanate ester-based curable resin composition (A) used in the molding composition of the invention is selected from the range of about 7–40 parts by weight, preferably 12–25% by weight. If the amount is less than 7 parts by weight, a poor binding effect results in and a uniform dispersion is difficulty achieved. If the amount of the curable resin composition used exceeds 40 parts by weight, an unacceptably low friction coefficient of the product pad results in. So use of the resin composition (A) in such a large amount is not practicable.

The amount of the fibrous reinforcement material (B) having a fiber diameter of less than 1 $\mu$m used in the molding composition of the present invention ranges from about 25 to about 70 parts by weight, preferably from 30–60% by weight. If the amount is less than 25 parts by weight, a too poor strength is achieved in the product disc brake pad. Where the amount exceeds 70 parts by weight, the preparation of the molding composition becomes difficult.

The amount of the friction abrasion moderator agent (C) used in the molding resin composition is in the range of from about 15 to about 60 parts by weight. If the amount is less than 15 parts by weight, a desired level of friction coefficient, anti-abrasion property and disc surface cleaning performance are difficulty achieved, When the amount exceeds 60 parts by weight, the product pad tends to exhibit unacceptably poor strength properties.

A preferred molding composition comprises:
12–25% by weight of a cyanate ester-based curable resin composition (A);
30–60% by weight of a fibrous reinforcement material (B) selected from rock-wool fibers and glass fibers; and
20–60% by weight of a friction abrasion moderator (C) consisting of 10–25% by weight of a lubricant comprising graphite as an essential component and optionally molybdenum disulfide and potassium titanate, 1–5% by weight of an organic, low-temperature friction material selected from rubber powder, cured resin powder and cashew dust and 5–15% by weight of barium sulfate.

Another preferred molding composition comprises:
15–25% by weight of a cyanate ester-based curable resin composition (A);
30–60% by weight of a fibrous reinforcement material (B) selected from rock-wool fibers and glass fibers; and
20–60% by weight of a friction abrasion moderator (C) consisting of 10–25 wt % of a lubricant comprising graphite as an essential component and optionally molybdenum disulfide and potassium titanate, 1–5 wt % of an organic, low-temperature friction material selected from rubber powder, cured resin powder or cashew dust, 5–15 wt % of barium sulfate and 5–25 wt % of metallic powder selected from copper, brass or iron.

In addition to these components, the molding resin composition of the present invention may comprise, for example, any known curing catalyst for the binder component (A), mold releasing agent and the like.

Preferred curing catalysts for the binder resin component (A) include organo metal salts (including metal chelate compounds), inorganic metal salts, organic peroxides and in particular an organo metal salt used alone and a catalyst system comprising an organo metal salt in combination with an organic peroxide. Examples of the organo metal salts include zinc naphtenate, lead naphthenate, lead stearate, zinc octoate, tin oleate, tin octoate, dibutyl tin malate, manganese naphthenate, cobalt naphthenate iron acetylacetonate, manganese naphthenate and the like. Examples of the organic peroxides include benzoyl peroxide, lauroyl peroxide, capryl peroxide, acetyl peroxide parachlorobenzoyl peroxide, di-tert-butyl-di-perphthalate and the like. These catalysts may be satisfactorily used in their conventional proportions respectively, for example at a level of 0.01–5% by weight of the total resin composition.

Examples of the mold releasing agents include internal releasing agents such as petroleum wax, carnauba wax, montan wax and the like.

The molding composition of the invention may be prepared by any convenient technique, provided it ensures uniform mixing of the components. For example, part of the friction abrasion moderator agent (C), such as barium sulfate or copper powder, may be dry mixed with the catalyst for component (A) to give a master batch, which may be then mixed together with component (A), and the internal mold releasing agent in suitable mixer means such as Henschel mixer. To the resulting homogeneous mixture, component (B) and the remainder part of component (C) are added simultaneously or separately and mixed, for example, in a roll mixer Banbury mixer or Henschel mixer. The mixing procedure may be effected at temperatures within the range of from ambient to 150° C. preferably from 60° to 130° C. for 1–30 minutes, preferably 3–10 minutes.

The thus prepared molding composition, if desired, may be preformed. If desired, an adhesive layer may applied to the surface of the resulting preform, to which a substrate is to be bonded in the subsequent molding stage that is effected under heated and pressurized conditions.

Examples of the pad substrates include iron or steel plate, fiber (e.g. glass fiber) reinforced plate and composite plates comprising an iron or steel plate and a fiber-reinforced plate. Preferably, the substrate is worked or machined to have a desired configuration suitable for producing the disc brake pad of a particular design. If the substrate is made of iron or steel plate, the surface thereof which is to be bonded to the molding resin composition in the subsequent molding stage should preferably be polished by any suitable technique, for example by blasting a suitable particulate grinder material (e.g. sand) and then coated with a thin adhesion-enhancing layer that may be based on a phenol resin, a melamine resin and particularly the above-described component (A). In order to enhance or strengthen the bonding between the substrate and the molding resin composition, the substrate may be perforated.

The substrate is placed in a suitable mold. Then the molding resin composition or a preform prepared therefrom is introduced onto the substrate. The thus formed assembly is then subjected to molding or shaping under high temperature and pressure conditions. The molding stage is effected at a pressure of about 100–800, preferably 150–700 kg/cm$^2$, a temperature of about 140°–300° C., preferably 160°–200° C. for a period of about 1–120 minutes, preferably 3–15 minutes. After the molding stage, usually the molded product is postcured at 150°–300° C., preferably 170°–250° C. for 2–24 hours, preferably 5–16 hours to complete the disc brake pad of the present invention.

EXAMPLE

The invention will be illustrated in more detail with reference to the following non-limiting Examples and Comparative Examples. In the Examples, all the amounts of materials given in "part" are by weight unless specified otherwise.

EXAMPLE 1

Iron acetylacetonate (0.3 parts) and dicumyl peroxide (0.5 parts) dissolved in methyl ethyl ketone were added, as a catalyst system, to 100 parts of a cyanate ester resin (available from Mitsubishi Gas Chemical as BT-2000; powder). The mixture was mixed in a Henschel mixer to give a homogeneous binder master batch.

The master batch was mixed with the following components to give a homogeneous molding composition according to the invention.

| Components | Proportions (parts) |
|---|---|
| Master batch | 17 |
| Glass fibers | 30 |
| Rock-wool fibers | 5 |
| Graphite | 20 |
| Molybdenum disulfide | 3 |
| Barium sulfate | 10 |
| Cashew dust | 5 |
| Brass powder | 20 |

The resulting molding composition was charged into a preforming mold to give a brake pad preform.

An iron plate 6 mm thick was punched to give a piece suitable for carrying the pad material. The surface of the piece was sandblasted and coated with a cyanate estermaleimide adhesive solution (available from Mitsubishi Gas Chemical as BT-A 300). The coated piece was dried to form an adhesive layer on the surface of the iron piece.

In a mold, the adhesive layer-carrying iron piece was placed and then the above-obtained preform was placed on the adhesive layered surface. The assembly was subjected to press molding at a temperature of 170° C. and a pressure of 200 kg/cm$^2$ for 10 minutes. The molding product was demolded and then postcured for 8 hours in an oven at 230° C. Thus, a semi-metallic disc brake pad was completed.

The disc brake pad was tested for its friction coefficient at various temperatures of from 100° to 350° C. The results are set forth in Table 1.

The disc brake pad was also subjected to a braking test under conditions of:

| temperature of disc rotor | 550° C. |
|---|---|
| moment of inertia | 5 kgf.m.sec$^2$ |
| initial speed | 160 km/hr. |
| braking deceleration | 0.6 G |
| number of braking | 200 |

The abrasion depth was measured. The tested pad was visually inspected. The results are shown in Table 2.

COMPARATIVE EXAMPLE 1

The procedure of Example 1 was repeated except that a phenol resin powder was used in place of cyanate ester resin in preparation of the master batch, that a nitrile rubbermodified phenol resin solution was used in place of the cyanate ester-maleimide adhesive solution, that the press molding was effected at a temperature of 150° C. and a pressure of 200 kg/cm² for 5 minutes, and that the postcuring was effected in an oven at 170° C. for 6 hours.

The resulting disc brake pad was tested as described in Example 1. The results are shown in Tables 1 and 2.

EXAMPLE 2

A catalyst system comprising 0.3 parts of iron acetylacetonate and 0.5 parts of dicumyl peroxide and a mold releasing agent (3 parts: Hoechst Wax OP powder) were added to 100 parts of a cyanate ester-maleimide resin (available from Mitsubishi Gas Chemical as BT-4480; powder passing 120 mesh). The mixture was mixed in a Henschel mixer to give a homogeneous binder master batch.

The master batch was mixed with the following components to give a homogeneous molding composition according to the invention.

| Components | Proportions (parts) |
|---|---|
| Master batch | 20 |
| Rock-wool fibers | 30 |
| Aramide fibers | 3 |
| Graphite | 12 |
| Barium sulfate | 10 |
| Cashew dust | 5 |
| Copper powder | 20 |

A piece of iron plate carrying an adhesive layer prepared as in Example 1 was placed in a mold. Then, the above-obtained molding composition was charged and press molded at a temperature of 170° C. and a pressure of 200 kg/cm² for 5 minutes. The demolded product was postcured in an oven at 230° C. for 8 hours.

The resulting semi-metallic disc brake pad was tested as described in Example 1. The results are shown in Tables 1 and 2.

COMPARATIVE EXAMPLE 2

A molding composition was prepared by repeating the procedure of Example 2 except that a phenol resin powder was used in place of the cyanate ester-maleimide resin in preparation of the master batch. A semi-metallic disc brake pad was press molded as described in Comparative Example 1.

The disc brake pad was tested as in Example 1. The results are shown in Tables 1 and 2.

EXAMPLE 3

The procedure of Example 2 was repeated except that the binder master batch was mixed with the following components in the preparation of molding composition.

| Components | Proportions (parts) |
|---|---|
| Master batch | 20 |
| Rock-wool fibers | 30 |
| Glass fibers | 20 |
| Aramide fibers | 2 |
| Graphite | 13 |
| Barium sulfate | 10 |
| Cashew dust | 5 |

The resulting disc brake pad was tested for the friction coefficient property as described in Example 1. The results are shown in Table 1.

COMPARATIVE EXAMPLE 3

The procedure of Example 1 was repeated except that a phenol resin powder was used in place of the cyanate estermaleimide resin (BT-4480) in the preparation of binder master batch and that a semi-metallic disc brake pad was prepared as described in Comparative Example 1.

The resulting disc brake pad was tested for the friction coefficient property as described in Example 1. The results are shown in Table 1.

EXAMPLE 4

A catalyst system comprising 0.2 pars of iron acetylacetonate and 0.5 parts of dicumyl peroxide dissolved in an appropriate amount of methyl ethyl ketone was added to 100 parts of a cyanate ester-maleimide resin (available from Mitsubishi Gas Chemical as BT-2480). The mixture was mixed in a Henschel mixer to give a homogeneous binder master batch.

The master batch was mixed with the following components to give a homogeneous molding composition of the present invention.

| Components | Proportions (parts) |
|---|---|
| Master batch | 20 |
| Glass fibers | 30 |
| Rock-wool fibers | 20 |
| Brass wires | 10 |
| Graphite | 10 |
| Barium sulfate | 5 |
| Xylene resin (available from Mitsubishi Gas Chemical as Nicanol H-80) | 5 |

A piece of iron plate carrying an adhesive layer prepared as in Example 1 was placed in a mold. Then, the above-obtained molding composition was charged and press molded at a temperature of 170° C. and a pressure of 230 kg/cm² for 7 minutes. The demolded product was postcured in an oven at 230° C. for 10 hours.

The resulting semi-metallic disc brake pad was tested for the friction coefficient property as described in Example 1. The results are shown in Table 1.

EXAMPLE 5

A catalyst system comprising 0.2 parts of iron acetylacetonate and 0.5 parts of dicumyl peroxide, and 3 parts of a mold releasing agent carnauba wax powder were added to 100 parts of a cyanate ester-maleimide resin (available from Mitsubishi Gas Chemical as BT-4680; powder passing 100 mesh). The mixture was mixed in a Henschel mixer to give a homogeneous binder master batch.

The master batch was mixed with the following components to give a homogeneous molding composition.

| Components | Proportions (parts) |
|---|---|
| Master batch | 15 |
| Stainless steel fibers | 30 |
| Graphite | 10 |
| Barium sulfate | 10 |
| Cashew dust | 2 |
| Copper powder | 20 |
| Glass short fibers | 3 |

A piece of iron plate carrying an adhesive layer prepared as in Example 1 was placed in a mold. Then, the above-obtained molding composition was charged and press molded at a temperature of 170° C. and a pressure of 230 kg/cm² for 7 minutes. The demolded product was postcured in an oven at 230° C. for 10 hours.

The resulting semi-metallic disc brake pad was tested as described in Example 1. The results are shown in Tables 1 and 2.

COMPARATIVE EXAMPLE 4

The procedure of Example 4 was repeated except that a phenol resin powder was used in place of the cyanate estermaleimide resin in the preparation of master batch and that a semi-metallic disc brake pad was prepared as described in Comparative Example 1.

The resulting disc brake pad was tested as described in Example 1. The results are shown together with the results of the other Examples in Tables 1 and 2 below.

TABLE 1

Friction coefficients at various temperatures

| Examples and Comparative Examples | Temperature (°C.) | | | | | |
|---|---|---|---|---|---|---|
| | 100 | 150 | 200 | 250 | 300 | 350 |
| Exp. 1 | 0.40 | 0.42 | 0.41 | 0.41 | 0.40 | 0.40 |
| Comp. Exp. 1 | 0.43 | 0.44 | 0.43 | 0.39 | 0.35 | 0.24 |
| Exp. 2 | 0.41 | 0.42 | 0.42 | 0.40 | 0.39 | 0.39 |
| Comp. Exp. 2 | 0.42 | 0.43 | 0.40 | 0.35 | 0.29 | 0.26 |
| Exp. 3 | 0.44 | 0.44 | 0.44 | 0.42 | 0.41 | 0.41 |
| Comp. Exp. 3 | 0.40 | 0.40 | 0.39 | 0.39 | 0.36 | 0.31 |
| Exp. 4 | 0.42 | 0.42 | 0.41 | 0.41 | 0.40 | 0.40 |
| Exp. 5 | 0.42 | 0.43 | 0.42 | 0.41 | 0.39 | 0.38 |
| Comp. Exp. 4 | 0.43 | 0.44 | 0.39 | 0.36 | 0.31 | 0.27 |

TABLE 2

Abrasion with a disc temperature of 550° C.

| | Exp. 1 | Comp Exp. 1 | Exp. 2 | Comp. Exp. 2 | Exp. 5 | Comp. Exp. 4 |
|---|---|---|---|---|---|---|
| Abrasion depth (mm) | 3.2 | 7.9 | 2.0 | 7.3 | 2.7 | 7.6 |
| Visual inspection after test | O | Δ | O | X | O | X |

Notes to TABLE 2
O ... unchanged
Δ ... slihtly shrunken
X ... shrunken and partly detached As described in hereinbefore, the disc brake pad according to the present invention exhibits a suitable level of friction coefficient at low temperatures, for example, within 100°–250° C., which remains substantially unchanged at raised temperatures, for example on the order of 350° C. In general, the friction coefficient of the present pad is significantly lower than those of the conventional brake pads containing phenol resin binders, in the lower temperature range. The extent of abrasion of the present pad at high temperatures is less than half of those of the conventional phenol resin-bound pads. The appearance of the present pad remains substantially unchanged after the abrasion test.

Therefore, the present pad is very advantageous over the conventional asbestos/phenol resin-based disc brake pads.

What is claimed is:

1. A disc brake pad which comprises an integral mass produced by molding a friction material-forming thermosetting resin composition together with a substrate under heated and pressurized conditions, said thermosetting resin composition comprising:
   (A) about 7–40 parts by weight of a cyanate ester-based curable resin composition selected from the group consisting of (a) polyfunctional cyanate esters, prepolymers of said cyanate ester, and prepolymers of said cyanate ester with an amine; and (a) in combination with at least one of (b) a polyfunctional maleimide, a prepolymer of said maleimide or a prepolymer of said maleimide with an amine, and (c) an epoxy resin;
   (B) about 25–70 parts by weight of at least one fibrous reinforcement material having a fiber diameter of not less than 0.1 μm, and
   (C) about 15–60 parts by weight of at least one friction abrasion moderator agent.

2. A disc brake pad according to claim 1 wherein the substrate is an iron or steel plate of a predetermined configuration having a surface roughened by polishing and then coated with a thin layer of a curable resin adhesive composition based on said cyanate ester, onto which surface the friction material-forming thermosetting resin composition is to be integrally molded to form said pad.

3. A disc brake pad according to claim 1 wherein the cyanate ester-based curable resin composition (A) is present in an amount of about 12–25% by weight of the friction material-forming thermosetting resin composition.

4. A disc brake pad according to claim 1 wherein the fibrous reinforcement material (B) is selected from glass fibers, rock-wool fibers, or mixture thereof.

5. A disc brake pad according to claim 1 wherein the friction abrasion moderator agent comprises about 10–25 parts by weight of a lubricant comprising graphite as an essential component and optionally molybdenum disulfide and potassium titanate, about 1–7 parts by weight of an organic, low-temperature friction material selected from rubber powder, cured resin powder or cashew dust and about 5–15 parts by weight of an aid selected from barium sulfate or calcium carbonate.

6. A disc brake pad according to claim 1 wherein the friction abrasion moderator agent (C) comprises about 10–25 parts by weight of a lubricant comprising graphite as an essential component and optionally molybdenum disulfide and potassium titanate, about 1–7 parts by weight of an organic, low-temperature friction material selected from rubber powder, cured resin powder or cashew dust, about 5–25 parts by weight of metallic powder of copper, brass or iron and about 5–15 parts by weight of an aid selected from barium sulfate or calcium carbonate.

* * * * *